ically, as soon as the vehicles have come

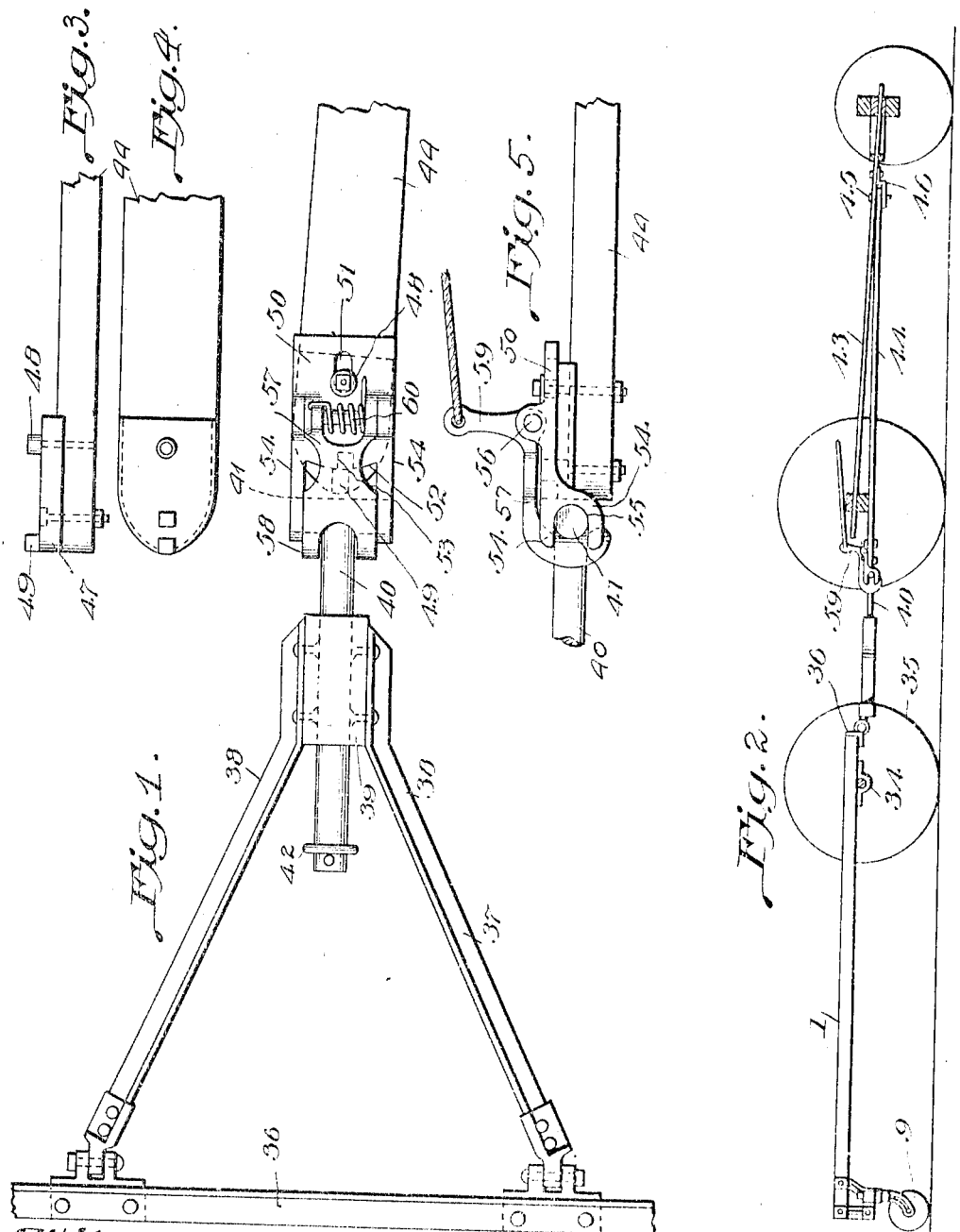

UNITED STATES PATENT OFFICE.

SAMUEL M. WIXCEL, OF MARCUS, IOWA.

AUTOMATIC HITCHING MECHANISM.

1,073,651.　　　　Specification of Letters Patent.　　Patented Sept. 23, 1913.

Original application filed October 1, 1906, Serial No. 337,001. Divided and this application filed December 12, 1912. Serial No. 736,264.

*To all whom it may concern:*

Be it known that I, SAMUEL M. WIXCEL, a resident of Marcus, in the county of Cherokee and State of Iowa, have invented certain new and useful Improvements in Automatic Hitching Mechanism, of which the following is a specification.

My invention relates to improved hitching mechanism which was fully illustrated and described, and claimed, together with other mechanism, in my original application Serial No. 337,001, filed October 1, 1906. The invention in this present application is therefore a division of the subject matter originally submitted and claimed in said original application.

Among the salient objects of the invention are to provide simple and improved hitching mechanism whereby a trailing vehicle may be readily hitched to a leading vehicle without regard to the particular angle at which the vehicles stand with reference to each other; to provide such arrangement that as soon as the vehicles are once brought into direct alinement, the hitching mechanism will automatically operate to lock and retain them in such alinement; to provide improved means whereby the hitch mechanism may be readily unlocked from a remote point to allow uncoupling of the vehicles; and in general to provide improved hitching mechanism which will enable two vehicles to be readily and quickly initially coupled together irrespective of their relative angular position, and which will automatically, as soon as the vehicles have come into alinement, rigidly lock and retain them in such alinement, the invention being particularly adaptable for coupling to a wagon a loading vehicle therefor, as for example a hay loader.

The invention can be readily understood from the following description and with reference to the accompanying drawings in which—

Figure 1 is a plan view of a hitch mechanism shown as applied to unite the front end of a loader with the rear end of a supplemental reach forming a part of the hay loader rig; Fig. 2 is a side elevation of the parts shown in Fig. 1 together with the lower part of the main frame of the loader proper and the lower portion of the running gear of a wagon to which the hitch mechanism is applied. Figs. 3 and 4 are side elevation and plan view, respectively, of that end of the supplemental reach which carries a part of the hitch mechanism; Fig. 5 is a side elevation of the hitch mechanism proper with the parts latched together.

Referring to the figures, 1 designates the main frame of a trailer vehicle, as for example a hay loader, the front end of the vehicle being supported by the usual axle 34 and main supporting wheels 35. Across the front end of the main frame is arranged to extend an angle bar 36 to which is pivotally attached a tongue frame 37 (see Fig. 1) comprising forwardly converging angle members 38 between which is bolted a socket member 39. Through the socket member is arranged to extend a draft link 40, the front end of which terminates in a T-head 41, and the rear end of which is provided with a stop collar 42 which prevents the draft link from being drawn out of the socket.

43 designates as a whole the running gear of a wagon which is shown in Fig. 2 somewhat diagrammatically, and 44 designates a supplemental reach which is pivotally secured to the main reach just in rear of the sway bar of the wagon by means of a draft pin 45 and clevis strap 46. The supplemental reach extends rearwardly below the rear axle of the wagon and terminates slightly in rear of the latter, at a point readily accessible to the operator by reaching under the wagon from the rear. Upon the free end of the reach is rigidly mounted a dogging member or casting 47, which is suitably bolted to the reach and is provided at its upper side with an upstanding pivot stud 48 and an upstanding dogging lug 49. On top of the member 47 is pivotally mounted a socketed latch member 50 which has a longitudinally extending slot 51 engaging the pivot stud 48, a curved front end surface 52 provided with a notch 53 adapted to engage the lug 49, extensions or arms 54 at each side of the curved surface 52 having in their ends open sockets 55 to receive the corresponding ends of the T-head 41 of the draft link, and upstanding pivot ears 56. Between the pivot ears is pivotally secured a keeper latch 57 which at its forward end is formed into a downturned hook 58 and is also provided with an upstanding arm 59. The hook 58 passes between the outer ends of the arms 54 and confines the T-head of the draft link within the sockets 55 of the latch member 50. The hook portion of the keeper latch may be lifted by means of a cord attached to the arm 59 thereof, to release the draft link, but said hook is normally held in operative position by means of a coiled spring 60.

The operation of this mechanism will be obvious but may be briefly set forth. Assuming that the loader has been previously disengaged from the wagon and the wagon returns to pick up the loader, the operator drives so as to stop the wagon with the rear end thereof straddling the tongue frame of the loader, and in this connection it is to be noted that it is not necessary that the wagon be brought into alinement with the loader since the supplemental reach can be swung laterally to any extent permitted by the rear wheels of the wagon. The sliding draft link enables the operator to in effect shorten or lengthen the tongue frame so that the head of the draft link may be adjusted to the draft mechanism on the reach within a considerable range of movement without moving the wagon or hay loader forwardly or rearwardly. Upon attempting to latch the parts together, the operator shifts the latch members forwardly upon the pivot 48 of the dogging member, thus freeing them from engagement with the lug 49 and permitting them to be brought to any angle necessary to coincide with the draft link. The draft link is now adjusted to position and the keeper latch closed to hold it in the socketed latch member, whereupon the operator simply drives ahead. The draft of the loader draws the latch mechanism taut, and if the latch members are not already in alinement with the dogging member 47, one or the other of the curved surfaces 52 will engage the front side of the lug 49 and prevent further rearward movement of the latch members until the loader and wagon are in exact alinement, whereupon the notch 53 will pass into engagement with the said lug and thus lock the loader in rigid alinement with the reach. The construction is, however, such that pivotal movement or flexure up and down is permitted between the latch mechanism and the draft link, so that in passing over elevations and depressions no strain is brought upon the mechanism.

The fact that the loader is attached to, and drawn from, a point from the wagon gear near the front axle thereof is of very great importance. This will be obvious when it is considered that the loader should at all times be as nearly in register with the rear part of the wagon as practicable, since otherwise the hay will not be discharged fairly upon the wagon. This is especially true in a loader of the present type in which the mechanism is of the expansible or retractible type and delivers the hay at various points along the length of the wagon. It will be obvious that inasmuch as the rear end of the wagon always trails and pivots about the king bolt at the front bolster, the hay loader trailing and pivoting from a point nearly coincident with the king bolt, will maintain itself approximately in alinement with the wagon. From the upstanding crank arm 59 the cord passes forward beneath the hay rack and up in front of same to a point on rack standard readily accessible to the driver and unhitching the loader from wagon is accomplished by a pull of cord which lifts the latch 57 and releases the draft link.

From the foregoing it will be obvious that the exact details of construction of the latch mechanism are not essential in the broader aspects of the invention.

I claim as my invention:

1. In combination with a wagon and a trailer frame, a hitch mechanism comprising a draft link mounted on one of said structures to shift endwise and guided and confined against substantial lateral movement within its mountings, a pair of coöperative latch members mounted upon the other structure, one of which in its semi-latched condition is free to oscillate laterally, and means operating automatically to lock said link and latch members against substantial lateral pivotal movement upon each other when they have been once drawn into alinement with each other.

2. In combination with a wagon and trailer frame, a hitch mechanism comprising a draft link mounted on one of said structures to shift endwise between definite limits and guided and confined against substantial lateral movement within its mountings, a socketed latch member and a coöperative keeper latch member mounted upon the other structure, said socketed latch member being in its semi-latched condition free to oscillate laterally upon its mountings, and a dogging mechanism operating automatically to lock said link and socket and keeper latch members together against substantial lateral pivotal movement upon each other when they have been once drawn into alinement.

3. In combination with a wagon and a trailer frame, a hitch mechanism comprising a guide socket and a draft link extending through said socket and shiftable endwise therein, one end of said draft link being provided with a T-head, a latch member provided with a transverse open socket adapted to receive said T-head, a keeper latch pivotally mounted to overlie the T-head and confine it within the socket, and a dogging member upon which the latch members are movably mounted, said dogging member and one of the latch members having interfitting parts adapted to be brought into engagement when the hitch mechanism is drawn into normal alinement.

4. In combination with a wagon and a trailer frame, a supplemental reach pivotally connected with the running gear of the wagon near the front bolster thereof and extending backwardly to a point in rear of the rear axle of the wagon, a tongue frame mounted upon the trailer frame and provided with a socket, a draft link mounted to shift endwise within said socket and headed at each end, a socketed latch member pivotally mounted upon the rear end of the supplemental reach and adapted to receive one of the headed ends of the draft link, a keeper latch member pivotally mounted upon the socketed latch member adapted to confine the head of the draft link in engagement with the socketed latch member, and a stationary dogging device mounted upon the supplemental reach and adapted to lock said latching mechanism and draft link against lateral flexure when under draft.

5. A hitching mechanism comprising in combination with a leading vehicle and a trailer vehicle, a draft link mounted on one of said vehicles in a guide affording limited endwise movement thereof, a coöperative latch mechanism mounted on the other vehicle, and means operating automatically to lock said link and latch mechanism in rigid alinement with each other.

6. A hitching mechanism comprising in combination with a leading vehicle and a trailer vehicle, a draft link mounted on one of said vehicles in a guide affording limited endwise movement thereof, a coöperative latch mechanism mounted on the other vehicle, means operating automatically to lock said link and latch mechanism in rigid alinement with each other, and operative connections extending from the latch mechanism to a remote point for releasing said mechanism.

7. In combination with a vehicle, a support secured to the vehicle, a frame on said support adapted for lateral oscillatory movement thereon, a draft link secured at one end by said frame, and interlocking mechanism for locking said frame to said support when said frame and support are primarily brought into alinement, and to prevent subsequent relative lateral displacement of said frame and support.

8. In combination with a vehicle, a support secured thereto, a frame on said support adapted for limited longitudinal movement and limited lateral oscillatory movement on said support, means on said frame for securing one end of a draft link, and interlocking mechanism rendered effective to lock the frame against further oscillatory movement when said frame is in alinement with said support and has been shifted longitudinally thereon.

9. In combination with a leading and trailing vehicle, of a draft link extending from the trailing vehicle, a draft link pivoted to the leading vehicle near the front bolster thereof and extending rearwardly a distance beyond the rear axle, latching mechanism secured to the rear end of said leading vehicle draft link and adapted to receive and to hold the end of the trailing vehicle draft link, said latching mechanism being pivoted to its supporting draft link for lateral oscillation, and means operable as soon as said draft links are brought into alinement to lock said draft links rigidly in such alinement.

In witness whereof, I hereunto subscribe my name this 9th day of December, A. D. 1912.

SAMUEL M. WIXCEL.

Witnesses:
 HARRY Z. FREEMAN,
 FLOYD S. BARNES.